United States Patent
Shi

(10) Patent No.: US 6,704,468 B2
(45) Date of Patent: Mar. 9, 2004

(54) OPTOELECTRONIC DEVICE AND A METHOD OF MANUFACTURE THEREOF

(75) Inventor: Yongqiang Shi, Diamond Bar, CA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/953,615

(22) Filed: Sep. 14, 2001

(65) Prior Publication Data

US 2003/0053729 A1 Mar. 20, 2003

(51) Int. Cl.⁷ .............................. G02F 1/035; G02B 6/10
(52) U.S. Cl. .................... 385/2; 385/132; 385/142; 385/8
(58) Field of Search ........................... 385/2, 8, 14, 39, 385/43, 49, 50, 129–132, 141, 142

(56) References Cited

U.S. PATENT DOCUMENTS

| | | | | |
|---|---|---|---|---|
| 4,865,407 A | * | 9/1989 | Suzuki et al. | 385/31 |
| 6,067,387 A | * | 5/2000 | Oh et al. | 385/2 |
| 2002/0118916 A1 | * | 8/2002 | Lee et al. | 385/28 |

* cited by examiner

*Primary Examiner*—John D. Lee
*Assistant Examiner*—Sarah U Song

(57) ABSTRACT

The present invention provides an optoelectronic device, a method of manufacture therefore, or an optical communications system including the optoelectronic device. The optoelectronic device may include a substrate and a waveguide located within the substrate. Additionally, the waveguide may include a first portion having a width, depth, and refractive index, and a second portion having a different width, depth and refractive index.

18 Claims, 9 Drawing Sheets

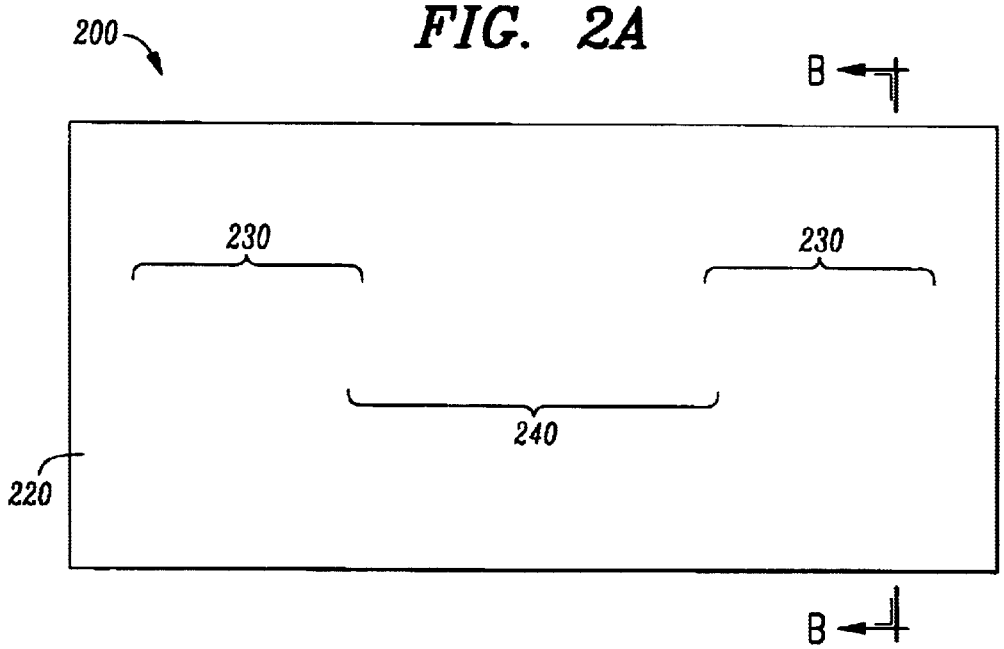
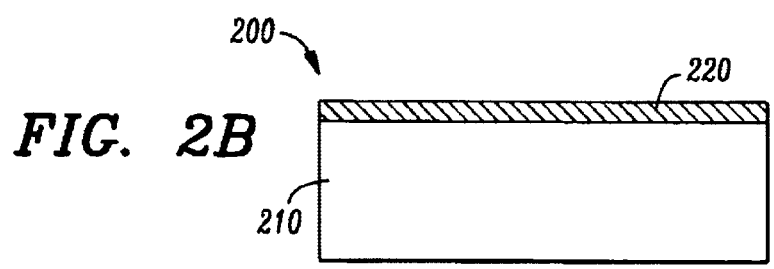
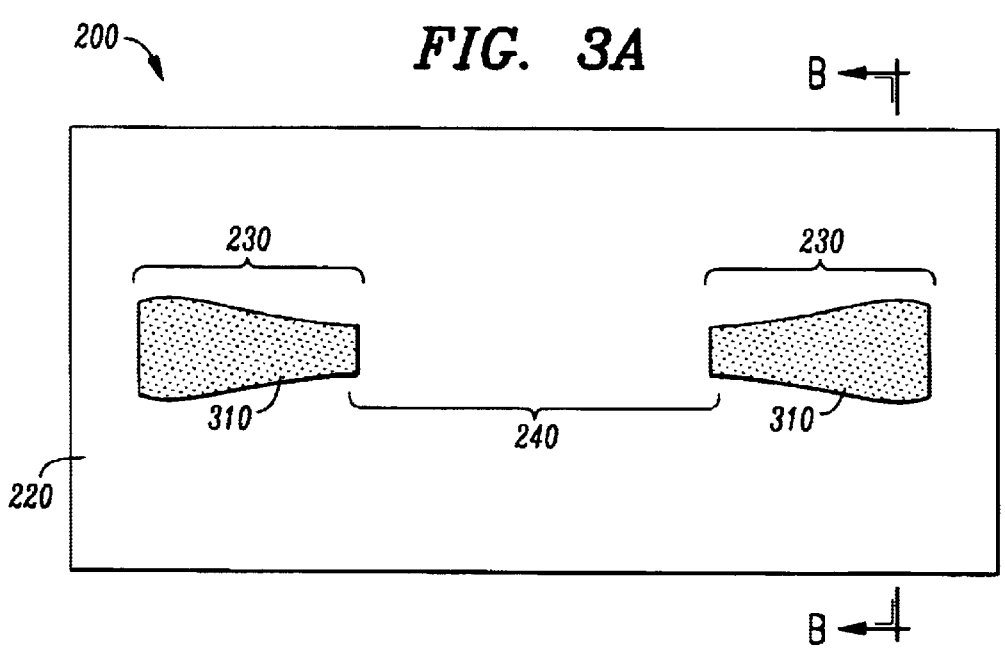

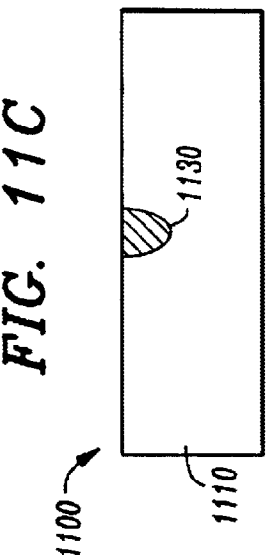
FIG. 11C
FIG. 11B
FIG. 12
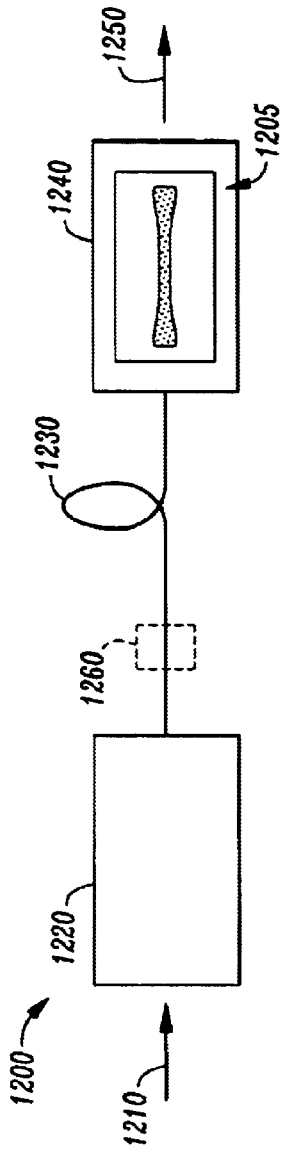
FIG. 13
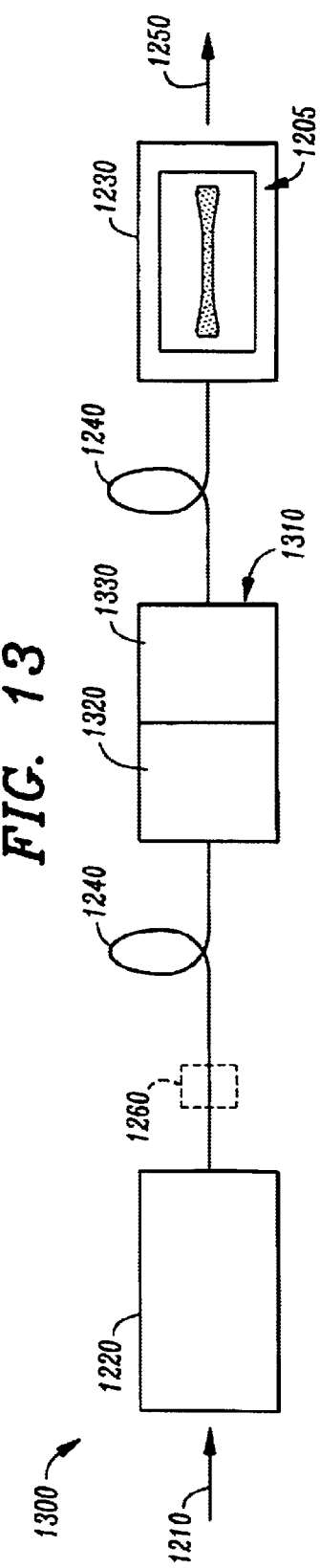

OPTOELECTRONIC DEVICE AND A METHOD OF MANUFACTURE THEREOF

TECHNICAL FIELD OF THE INVENTION

The present invention is directed, in general, to an optical communications system and, more specifically, to an optoelectronic device and a method of manufacture therefor.

BACKGROUND OF THE INVENTION

Certain types of waveguide based optical switches, also referred to as optical modulators, are commonly used in today's optical communications systems. An optical modulator is generally known as a device that modulates or varies an amplitude of an optical signal passing therethrough. Such optical modulators have many different uses in today's optical communications systems. For example, high-speed optical modulators are used to encode information into an optical signal generated by an optical source, such as an optical laser, where the information is represented by changes in the amplitude of the optical signal. Additionally, low-speed optical modulators (also referred to as optical attenuators), may be used in conjunction with an optical amplifier to control the overall gain of an amplifier stage. This is generally used to account for gradual changes in a received optical signal, for example, as an optical source ages.

There is currently a desire to provide optical modulators that have both high throughput and low driving voltage. A problem arises in that high throughput and low driving voltage are not mutually exclusive. For example, increasing the throughput requires matching a mode size of a waveguide of the optical modulator with a spot size of a fiber being coupled to the optical modulator. Increasing the mode size of the waveguide to improve throughput causes an electric field associated with the waveguide to diverge, thus, requiring a higher driving voltage to operate the optical modulator. Additionally, reducing the driving voltage of the optical modulator requires reducing the size of the waveguide mode, however, such a design choice causes the throughput of the device to decrease because the spot size of the fiber no longer matches the mode size of the waveguide.

Prior art devices attempted to optimize the overall performance of the optical modulator (given the non mutual exclusive nature of the optical throughput and drive voltage) by sacrificing a portion of the optical throughput to achieve a lower device voltage, or sacrificing a little higher device voltage to achieve a higher optical throughput. It has been found, however, that such a design produces an inefficient optical modulator that does not attain the stringent requirements of today's optical modulators.

Accordingly, what is needed in the art is an optical modulator that attains the stringent requirements of today's optical modulators and does not experience the problems experienced by the prior art optical modulators.

SUMMARY OF THE INVENTION

To address the above-discussed deficiencies of the prior art, the present invention provides an optoelectronic device, a method of manufacture therefore, or an optical communications system including the optoelectronic device. The optoelectronic device may include a substrate and a waveguide located within the substrate. Additionally, the waveguide may include a first portion having a width, depth, and refractive index, and a second portion having a different width, depth and refractive index.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description, when read with the accompanying FIGUREs. It is emphasized that in accordance with the standard practice in the optoelectronic industry, various features may not be drawn to scale. In fact, the dimensions of the various features may be arbitrarily increased or reduced for clarity of discussion. Reference is now made to the following descriptions taken in conjunction with the accompanying drawings, in which:

FIGS. 2A, 2B illustrate various views of a partially completed optoelectronic device, which is in accordance with the principles of the present invention;

FIGS. 3A, 3B illustrate various views of the partially completed optoelectronic device shown in FIGS. 2A–2B, after forming photoresist portions over a first diffusion material layer;

FIGS. 11A, 11B, 11C illustrate plan and cross-sectional views of an alternative embodiment of an optoelectronic device, which is in accordance with the principles of the present invention;

FIG. 12 illustrates a cross-sectional view of an optical communications system, which may form one environment in which an optoelectronic device similar to the optoelectronic device illustrated in FIG. 1, may be used; and FIG. 13 illustrates an alternative optical communications system, having a repeater, including a second transmitter and a second receiver located between a transmitter and a receiver.

DETAILED DESCRIPTION

Figure 1A:
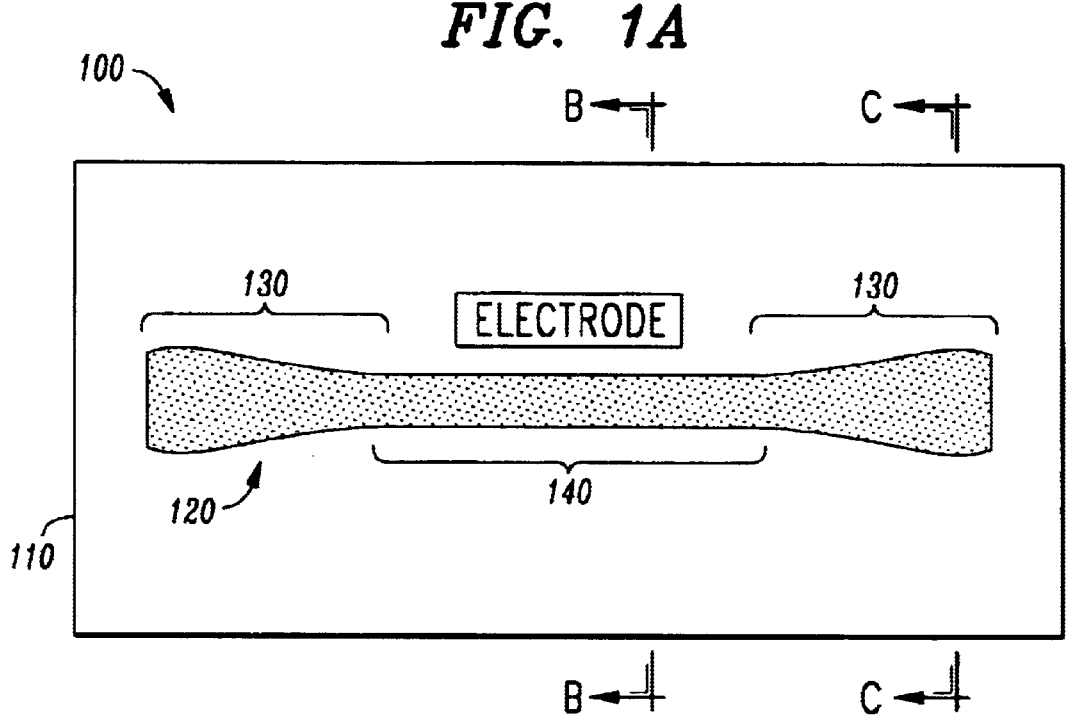
FIGS. 1A, 1B, 1C illustrate various views of an optoelectronic device, which has been constructed according to the principles of the present invention.
Figure 1B:
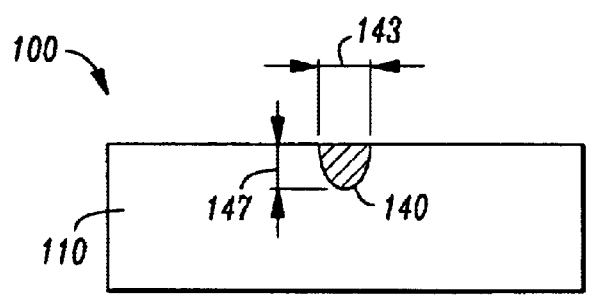
Figure 1C:
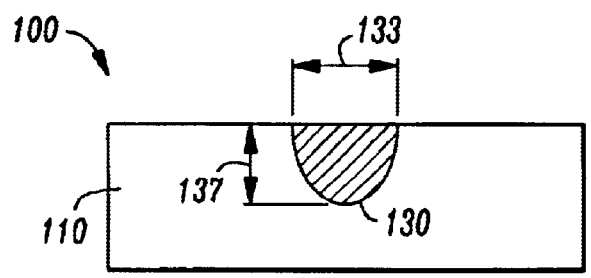

Referring initially to FIGS. 1A–1C illustrated are various views of an optoelectronic device 100, which has been constructed according to the principles of the present invention. In the illustrative embodiment shown in FIG. 1A, the optoelectronic device 100 includes a substrate 110. The substrate 110, which may be an electrooptic crystal, including lithium niobate or another similar substrate, has a waveguide 120 located therein. In the illustrative embodiment, the waveguide 120 may comprise titanium, however, any other known or hereafter discovered waveguide material is within the scope of the present invention. The waveguide 120 includes a first portions 130 and a second portion 140. While two first portions 130 are shown in FIG. 1, it should be understood that more or less than two first portions 130 are within the scope of the present invention. In a completed optoelectronic device, electrodes (not shown) could be located adjacent the second portion 140.

Turning to FIGS. 1B and 1C, shown are cross-sectional views of the optoelectronic device 100 taken through the lines BB and CC, respectively. As illustrated, the first portion 130 has a width 133 and depth 137 and the second portion 140 has a different width 143 and depth 147. In an exemplary embodiment, the first portion 130 is a coupling portion that includes first and second coupling portions, and the second portion is a modulation portion. Additionally, a ratio of a surface dopant density of the second portion 140 to a surface dopant density of the first portions 130 may range from about 6:5 to about 2:1.

Because a manufacturer of the optoelectronic device 100 may tailor the coupling portion to have one width 133 and depth 137, and tailor the modulation portion to have a different width 143 and depth 147, the optoelectronic device 100 may simultaneously achieve both high throughput and low driving voltage, and have differing refractive index within the different portions. This, as previously recited, is in direct contrast to the prior art devices, which must compromise between the two, or choose one or another. As such, the optoelectronic device 100 operates more efficiently than the prior art devices. Moreover, because of the differing widths and depths, the mode spot sizes are optimized to match those between the optical fibers and the input and output ports, while the mode sizes are further optimized to minimize driving voltage under the electrodes. While the optoelectronic device 100 illustrated in FIG. 1 is an optical modulator, other optoelectronic devices are within the scope of the present invention.

Turning now to FIGS. 2A–9C, illustrated are cross-sectional and plan views of detailed manufacturing steps illustrating how an exemplary embodiment of an optoelectronic device, similar to the optoelectronic device 100 illustrated in FIGS. 1A–1C, may be manufactured. FIG. 2A illustrates a plan view of a partially completed optoelectronic device 200, which is in accordance with the principles of the present invention. The partially completed optoelectronic device 200 includes a first portion region 230 and a second portion region 240. In the illustrative embodiment shown in FIG. 2A, two first portion regions 230 are shown.

Turning to FIG. 2B, illustrated is a cross-sectional view of the partially completed optoelectronic device 200 illustrated in FIG. 2A taken through the cross-section BB, wherein the partially completed optoelectronic device 200 includes a first diffusion material layer 220 located over a substrate 210. The substrate 210 may comprise any known or hereafter discovered material that is consistent with the design of the optoelectronic device 200, including lithium niobate or other similar materials. Additionally, the substrate 210 may have a thickness ranging from about 100 $\mu$m to about 1000 $\mu$m, and more preferably a thickness of about 500 $\mu$m.

Likewise, the first diffusion material layer 220 may comprise many different materials. For example, the first diffusion material layer 220 may include a metal, such as titanium or nickel, or may include other materials that are consistent with the design of the optoelectronic device 200. Additionally, the first diffusion material layer 220 may have a dopant density (e.g., titanium or nickel density) ranging from about 20 micrograms/cm$^2$ to about 30 micrograms/cm$^2$.

The first diffusion material layer 220 may be conventionally formed using a physical vapor deposition (PVD), chemical vapor deposition (CVD), or another similar process. Additionally, the first diffusion material layer 220 may be formed to a thickness ranging from about 60 nm to about 90 nm, and more preferably a thickness of about 70 nm. It should be noted, however, the thickness of the first diffusion material layer 220 is proportional to the amount of diffusion material desired in the substrate 210.

Turning to FIG. 3A, illustrated is a plan view of the partially completed optoelectronic device 200 shown in FIG. 2A, after conventional formation and patterning of the first diffusion material layer 220. In the illustrative embodiment shown in FIG. 3A, photoresist portions 310 are located in the first portion regions 230.

Figure 3B:
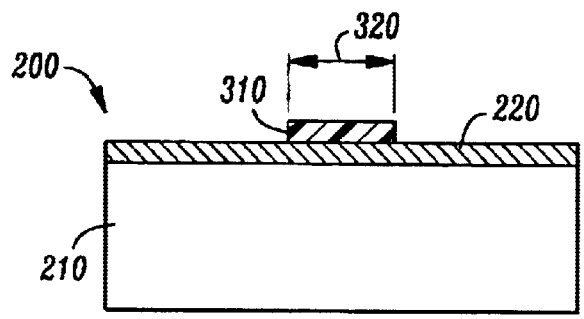

FIG. 3B illustrates a cross-sectional view of the partially completed optoelectronic device 200 shown in FIG. 3A and taken through the cross-section CC. As illustrated in the cross-sectional view of FIG. 3B, the photoresist portion 310 may have a width 320. The width 320 of the photoresist portion 310 is generally determined by a width required to match a spot size of an optical fiber being coupled to the optoelectronic device 200. For example, in an exemplary embodiment, this width 320 may be about 10 $\mu$m. It should be noted, however, other widths are also within the scope of the present invention.

Figure 4A:
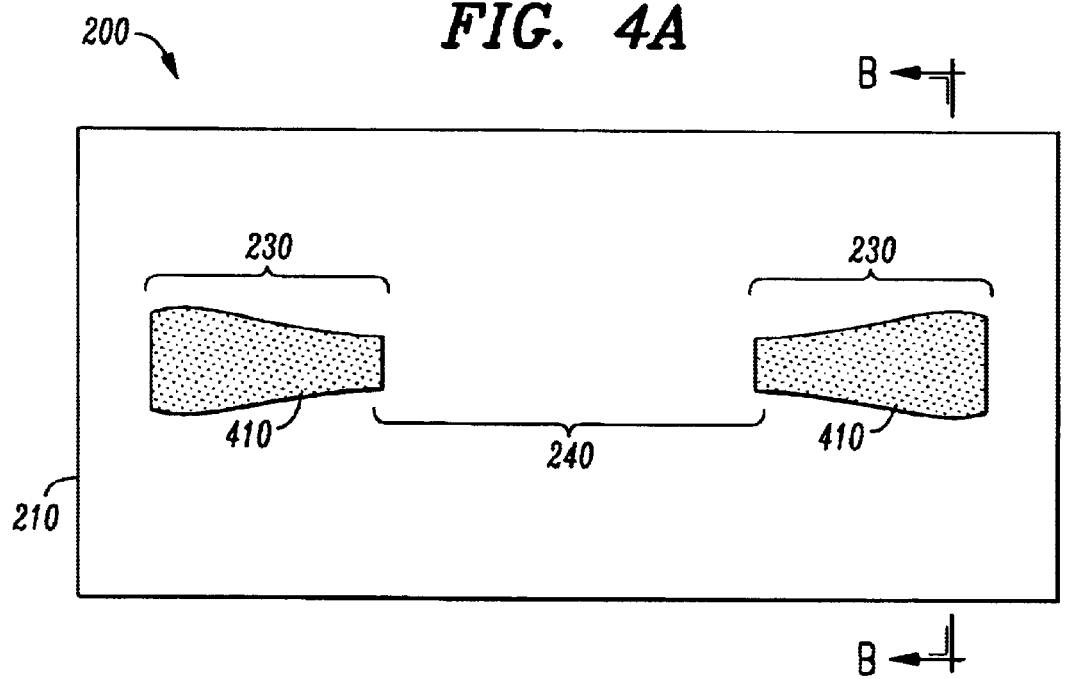
FIGS. 4A, 4B illustrate various views of the partially completed optoelectronic device illustrated in FIGS. 3A–3B, after using the photoresist portions to pattern the first diffusion material layer.

Turning to FIG. 4A, illustrated is a plan view of the partially completed optoelectronic device 200 illustrated in FIG. 3A, after using the photoresist portions 310 to pattern the first diffusion material layer 220. What results are diffusion material portions 410 located in the first portion regions 230.

Figure 4B:
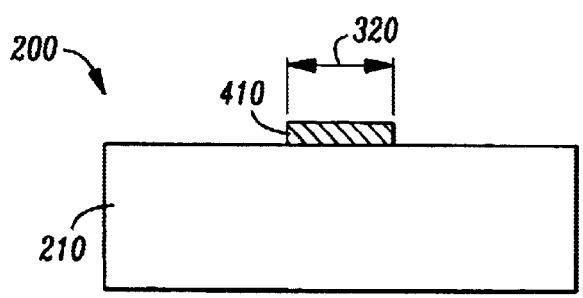

FIG. 4B illustrates a cross-sectional view of the partially completed optoelectronic device 200 shown in FIG. 4A and taken through the cross-section CC. As illustrated in the cross-sectional view of FIG. 4B, the diffusion material portions 410 are located on the substrate 210. Similar to the photoresist portions 310, the diffusion material portions 410 may have the width 320, wherein the width 320 is designed to provide high throughput.

Figure 5A:
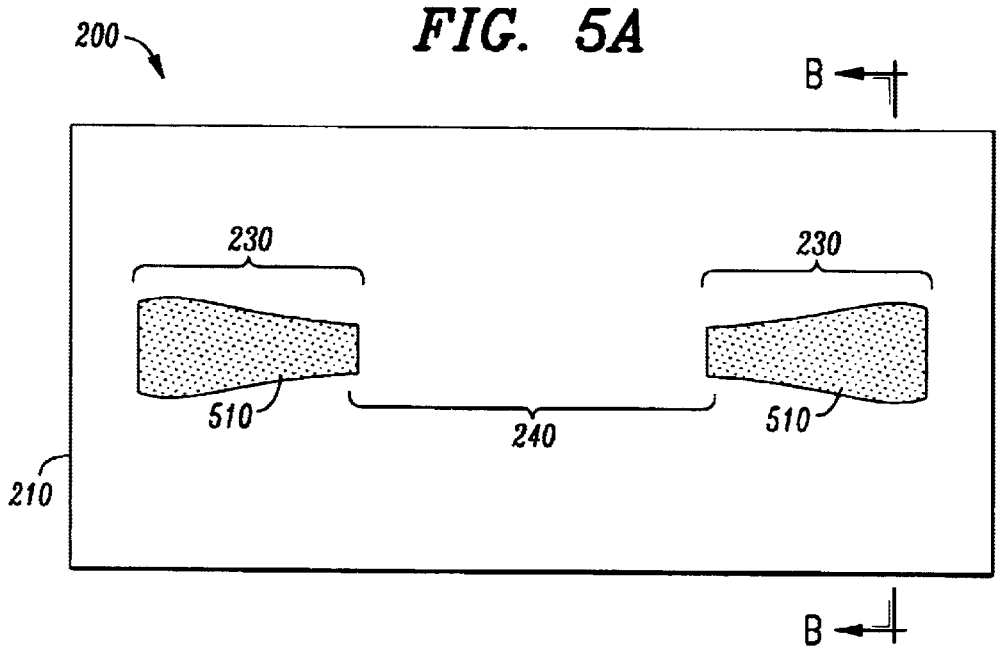
FIGS. 5A, 5B illustrate various views of the partially completed optoelectronic device illustrated in FIGS. 4A–4B, after an indiffusion step.

Turning to FIG. 5A, illustrated is a plan view of the partially completed optoelectronic device 200 illustrated in FIG. 4A, after an annealing step that diffuses the diffusion material portions 410 into the substrate 210 to form diffusion portions 510. In an exemplary embodiment, the annealing step is performed at a temperature ranging from about 900° C. to about 1100° C. for a time ranging from about 7 hours to about 10 hours. The annealing time and temperature, however, may be designed to accommodate different diffusion materials of a specific optoelectronic device. Depending on the time and temperature of the anneal, more or less of the diffusion material portions 410 may remain after the anneal. For example, in one embodiment the entire diffusion material portions 410 diffuse into the substrate 210, however, in an alternative embodiment, portions of the diffusion material portions remain after the anneal and must subsequently be removed.

Figure 5B:
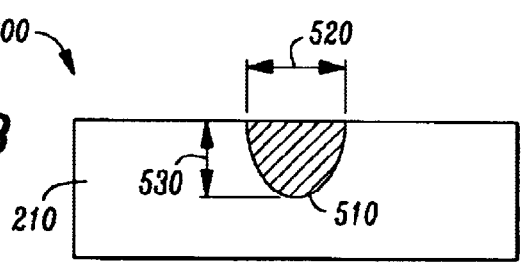

FIG. 5B illustrates a cross-sectional view of the partially completed optoelectronic device 200 shown in FIG. 5A and taken through the cross-section CC. As illustrated in the cross-sectional view of FIG. 5B, the diffused portions 510 have an initial width 520 and an initial depth 530. While the initial width 520 should be similar to the width 320 of the diffusion material portions 410, the anneal may cause the initial width 520 to be slightly larger than the width 320. In an exemplary embodiment, the initial width 520 should be about 10 μm and the initial depth 530 should range from about 3 μm to about 6 μm.

Figure 6A:
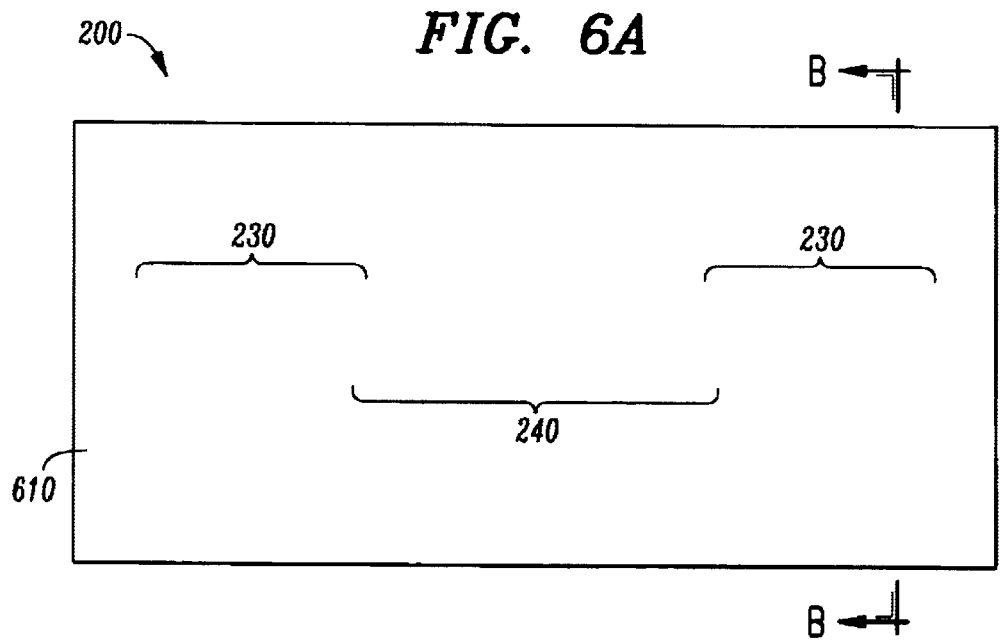
FIGS. 6A, 6B illustrate various views of the partially completed optoelectronic device shown in FIGS. 5A–5B, after blanket depositing a second diffusion material layer over the substrate.

Turning to FIG. 6A, illustrated is a plan view of the partially completed optoelectronic device 200 shown in FIG. 5A, after blanket depositing a second diffusion material layer 610 over the substrate 210. The second diffusion material layer 610 may comprise a similar material as the first diffusion material layer 220. For example, a titanium diffusion material layer is useful. However, in one embodiment the second diffusion material layer 610 may have a dopant density (e.g., titanium density) ranging from about 30 micrograms/cm$^2$ to about 50 micrograms/cm$^2$.

Figure 6B:
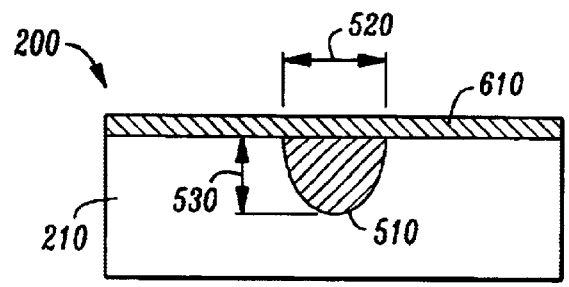

The second diffusion material layer 610 may be conventionally formed using a PVD, CVD, or another similar process. Additionally, the second diffusion material layer 610 may be formed to a thickness ranging from about 85 nm to about 180 nm, and more preferably a thickness of about 100 nm. It should be noted, however, the thickness of the second diffusion material layer 610 is proportional to the amount of diffusion material desired in the substrate 210. As illustrated in FIG. 6B, the second diffusion material layer 610 is located over the diffused portion 510.

Figure 7A:
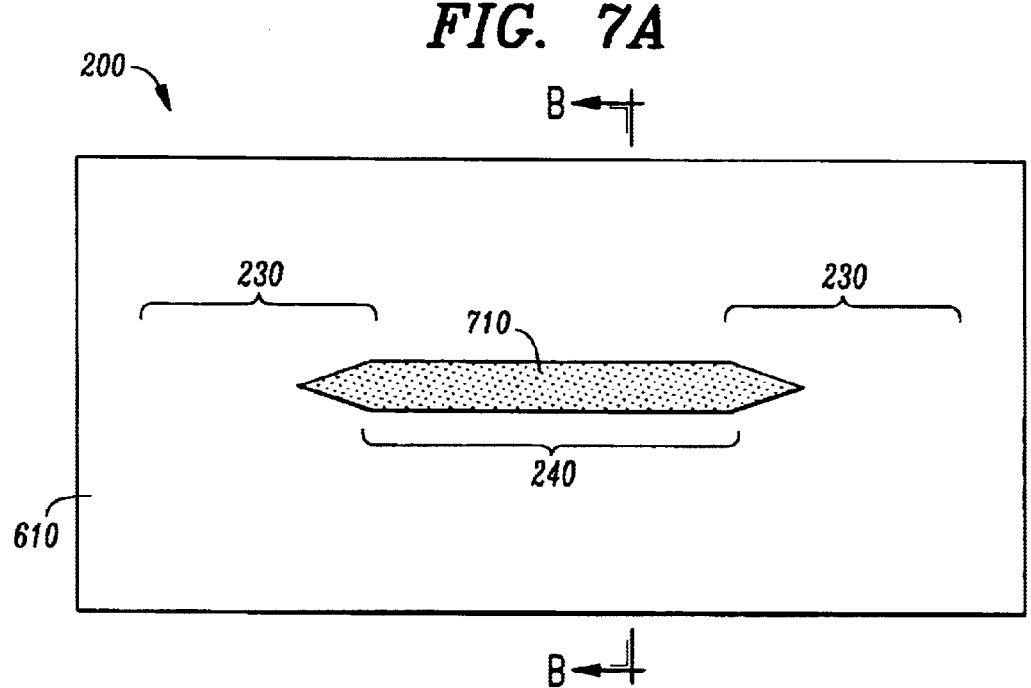
FIGS. 7A, 7B illustrate various views of the partially completed optoelectronic device illustrated in FIGS. 6A–6B, after formation of a photoresist portion thereover.

Turning to FIG. 7A, illustrated is a plan view of the partially completed optoelectronic device 200 illustrated in FIG. 6A, after formation of a photoresist portion 710 thereover. The photoresist portion 710, which may be formed using a similar process to the photoresist portions 310, is located in the second portion region 240. As illustrated, the photoresist portion may have tapered ends. The tapered ends may be beneficial because it is believed that they help provide a smooth transition between the diffused portions 510 and a diffused portion 930 (FIG. 9) formed in a subsequent step. The term "smooth transistion" should be construed to mean that there is not a vertical step between the diffused portions 510 and the diffused portion 930. It should be noted, however, the photoresist portion 710 may have a wide range of shapes while staying within the bounds of the present invention.

Figure 7B:
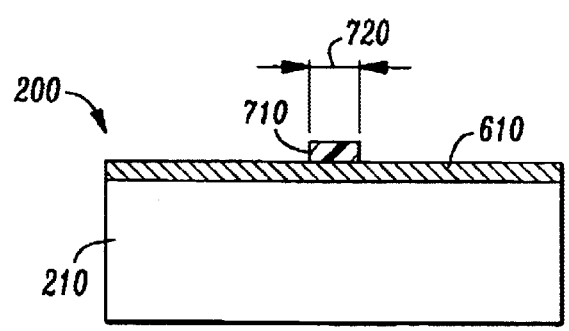

FIG. 7B illustrates a cross-sectional view of the partially completed optoelectronic device 200 shown in FIG. 7A and taken through the cross-section BB. As illustrated in the cross-sectional view of FIG. 7B, the photoresist portion 710 may have a width 720. The width 720 of the photoresist portion 710 is generally determined by a width required to achieve a minimum driving voltage of the optoelectronic device. For example, in an exemplary embodiment, this width 720 may range from about 3 μm to about 6 μm. It should be noted, however, other widths are also within the scope of the present invention.

Figure 8A:
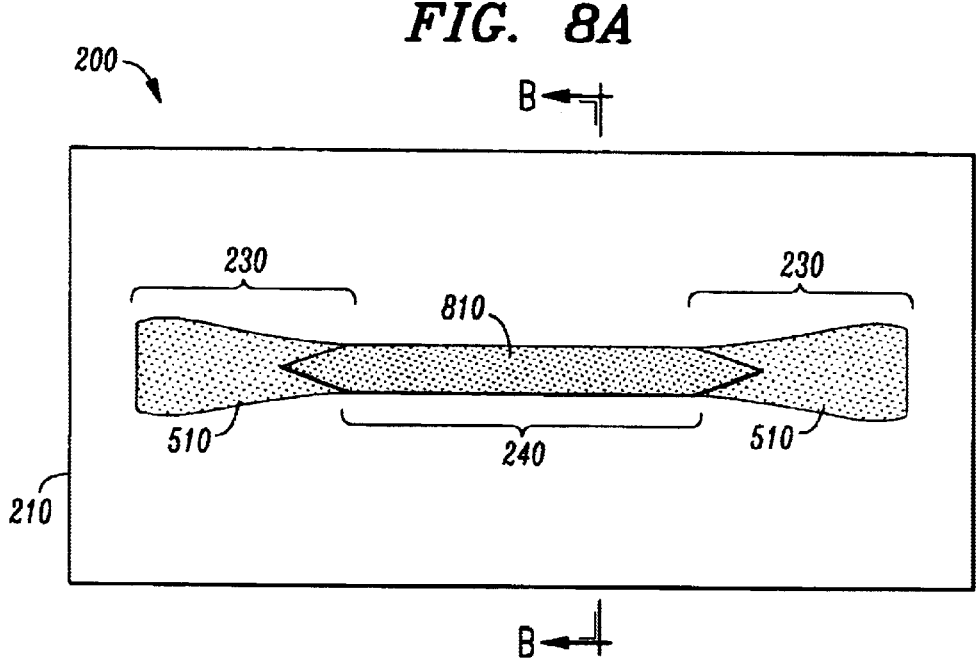
FIGS. 8A, 8B illustrate various views of the partially completed optoelectronic device illustrated in FIGS. 7A–7B, after using the photoresist portion 710 to pattern the second diffusion material layer.

Turning to FIG. 8A, illustrated is a plan view of the partially completed optoelectronic device 200 illustrated in FIG. 7A, after using the photoresist portion 710 to pattern the second diffusion material layer 610. What results is a diffusion material portion 810 located in the second portion region 240, and that is diffused into the substrate 210 in a subsequent step as discussed below.

Figure 8B:
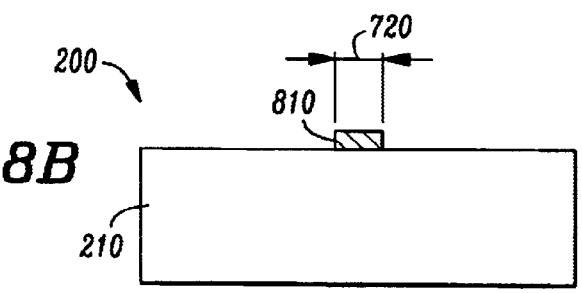

FIG. 8B illustrates a cross-sectional view of the partially completed optoelectronic device 200 shown in FIG. 8A and taken through the cross-section BB. As illustrated in the cross-sectional view of FIG. 8B, the diffusion material portion 810 is located on the substrate 210. Similar to the photoresist portions 710, the diffusion material portion 810 may have the width 720. As previously recited, the width 320 is designed to allow the optoelectronic device 200 to operate at a lower drive voltage.

Figure 9A:
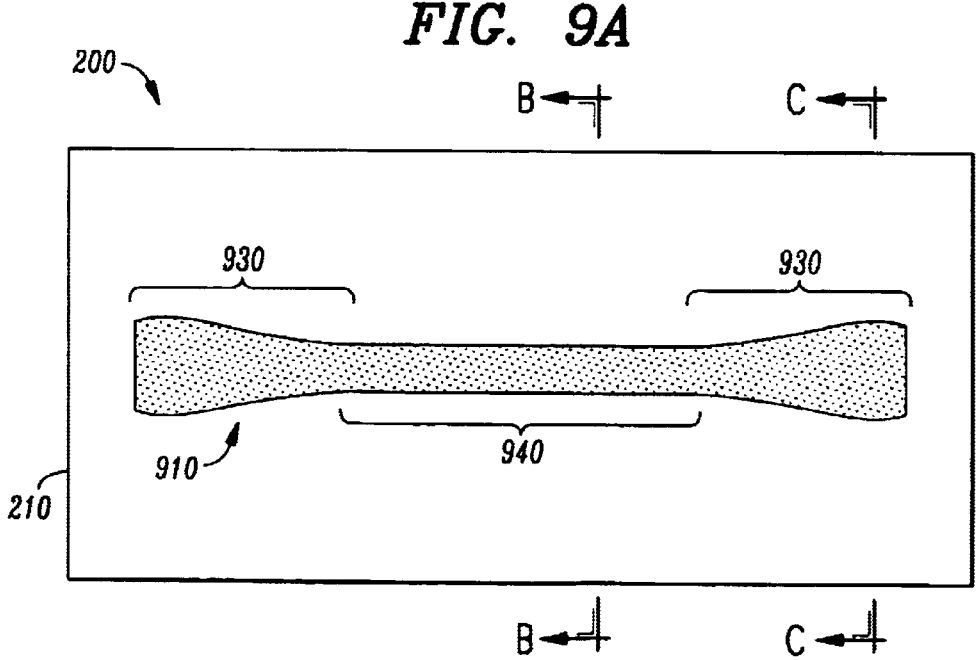
FIGS. 9A, 9B, 9C illustrate various views of the partially completed optoelectronic device illustrated in FIGS. 8A–8B, after an indiffusion step.

Turning to FIG. 9A, illustrated is a plan view of the partially completed optoelectronic device 200 illustrated in FIG. 8A, after an annealing step and removal of the diffusion material portion 810. What results is the diffusion material portion 810 diffusing into the substrate 210, creating a second diffused portion 940. In an exemplary embodiment, the annealing step is performed at a temperature ranging from about 900° C. to about 1100° C. for a time ranging from about 4 hours to about 8 hours. The annealing time and temperature, however, may be designed to accommodate a specific optoelectronic device.

Figure 9B:
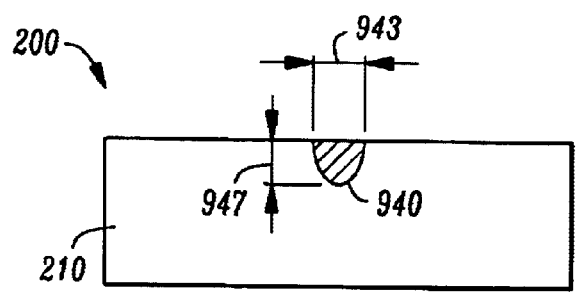
Figure 9C:
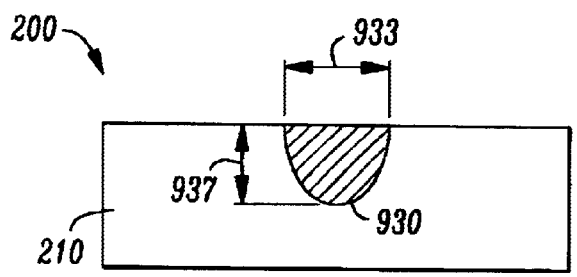

FIGS. 9B & 9C illustrate cross-sectional views of the partially completed optoelectronic device 200 shown in FIG. 9A and taken through the cross-sections BB and CC, respectively. As illustrated in FIGS. 9B and 9C, the second diffused portion 940 has a width 943 and a depth 947. While the width 943 should be similar to the width 720 of the diffusion material portion 810, the anneal may cause the width 943 to be slightly larger than the width 720. In an exemplary embodiment, the width 943 should range from about 3 μm to about 6 μm and the depth 947 should range from about 1 μm to about 4 μm.

Take note that the anneal step used to form the second diffused portion 940 may cause the diffused portions 510 (FIG. 5) to diffuse deeper into the substrate 210, thus, forming first diffused portions 930. As illustrated, the first diffused portion 930 has a width 933 and depth 937, and the second diffused portion 940 has a different width 943 and a different depth 947. What results after completing the first diffused portion 930 and second diffused portions 940 is a completed waveguide 910. What further results is an optoelectronic device 200 similar to the optoelectronic device 100 illustrated in FIG. 1.

Figure 10A:
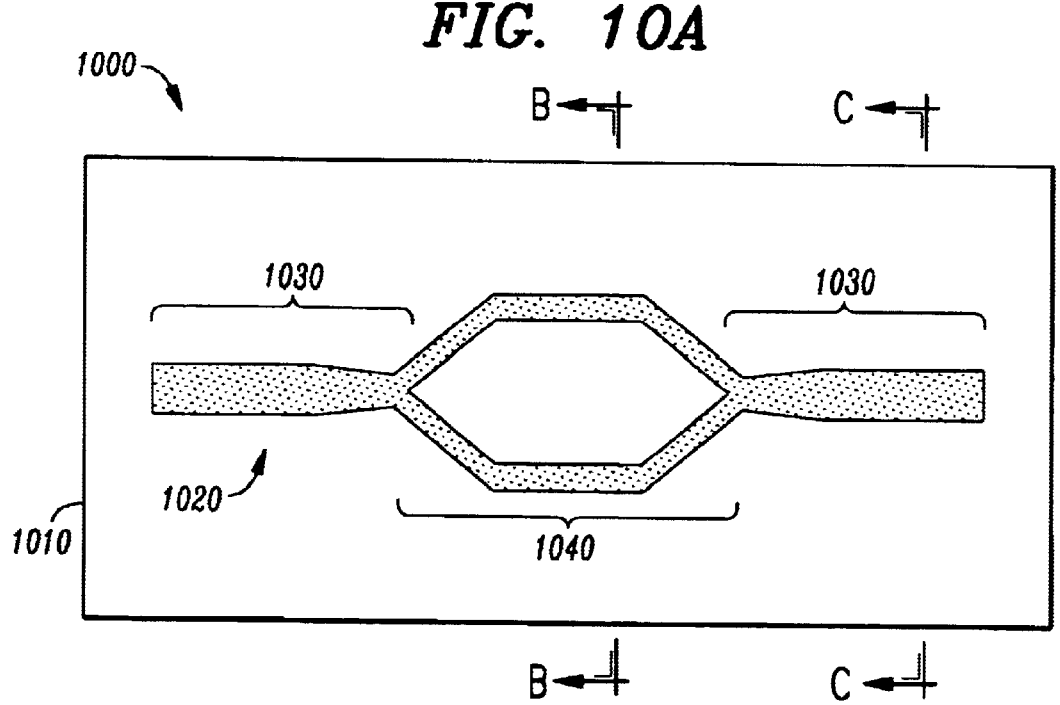
FIGS. 10A, 10B, 10C illustrate plan and cross-sectional views of an alternative embodiment of an optoelectronic device, which is in accordance with the principles of the present invention.
Figure 10B:
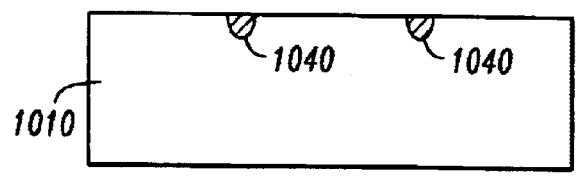
Figure 10C:
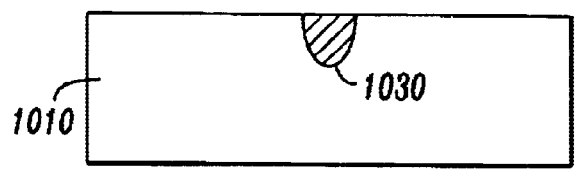

Turning to FIGS. 10A–10C illustrated are plan and cross-sectional views of an alternative embodiment of an optoelectronic device 1000, which is in accordance with the principles of the present invention. The optoelectronic device 1000 includes a substrate 1010 having a waveguide 1020 located therein. The waveguide 1020 includes first portions 1030 having a width and depth and a second portion 1040 having a different width and depth. In the illustrative embodiment, the first portions 1030 only include the ends and do not include a branched portion. As illustrated, the branched portion may be included in the second portion 1040. It should be understood that the waveguide 1020 may be manufactured using a similar process as discussed above with respect to the waveguide 100 shown in FIG. 1.

Figure 11A:
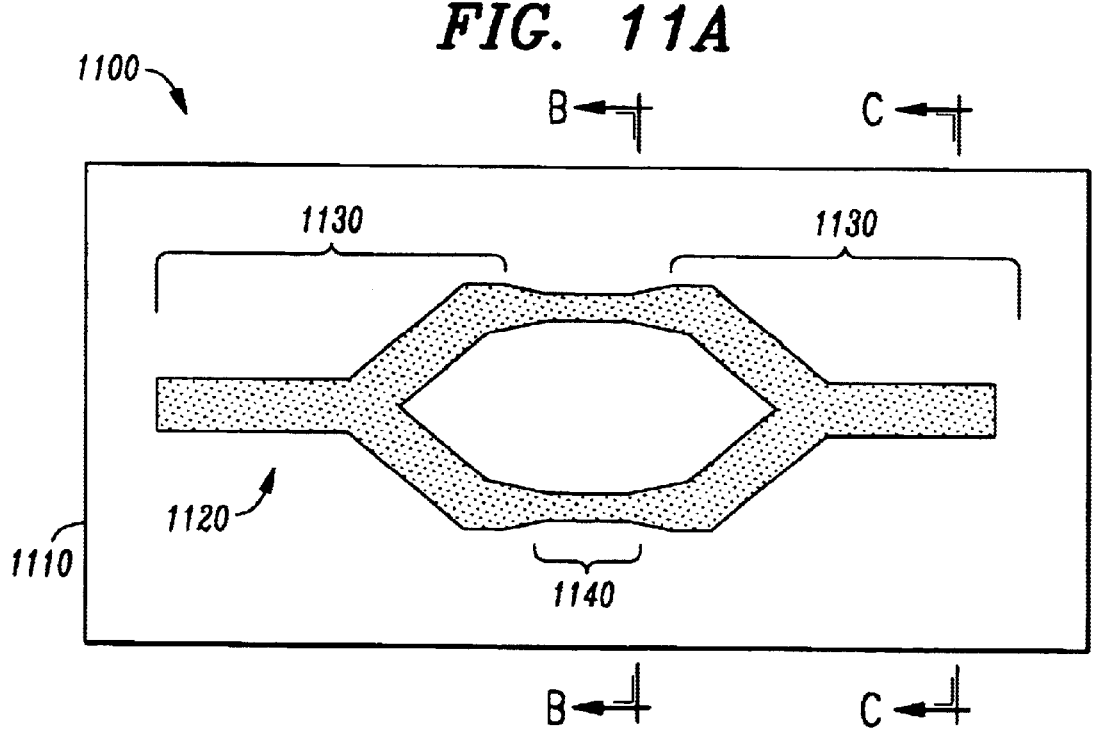

Turning to FIGS. 11A–11C illustrated are plan and cross-sectional views of an alternative embodiment of an optoelectronic device 1100, which is also in accordance with the principles of the present invention. The optoelectronic device 1100 includes a substrate 1110 having a waveguide 1120 located therein. The waveguide 1120 includes first portions 1130 having a width and depth and a second portion 1140 having a different width and depth. In contrast to the embodiment illustrated in FIGS. 10A–10C, the first portions 1130 include a portion of the branched portion. In such an instance, the throughput may be higher, thus, the insertion loss may be less. It should be understood that the waveguide 1120 may be manufactured using a similar process as discussed above with respect to the waveguide 100 shown in FIG. 1.

Turning to FIG. 12, illustrated is a cross-sectional view of an optical communications system 1200, which may form one environment in which an optoelectronic device 1205 in accordance with the principles of the present invention may be used. An initial signal 1210 enters a transmitter 1220 of the optical communications system 1200. The transmitter 1220, receives the initial signal 1210, addresses the signal 1210 and sends the resulting information across an optical fiber 1230 to a receiver 1240. The receiver 1240 receives the information from the optical fiber 1230, addresses the information and sends an output signal 1250. As illustrated in FIG. 12, the optoelectronic device 1205 may be included within the receiver 1240. However, the optoelectronic device 1205 may also be included anywhere in the optical communications system 1200, including the transmitter 1220. The optical communications system 1200 is not limited to the devices previously mentioned. For example, the optical communications system 1200 may include an element 1260, such as a laser, diode, modulator, optical amplifier, optical waveguide, photodetectors, or other similar device.

Turning briefly to FIG. 13, illustrated is an alternative optical communications system 1300, having a repeater 1310, including a second transmitter 1320 and a second receiver 1330, located between the transmitter 1220 and the receiver 1240, as well as the optoelectronic device 1205.

Although the present invention has been described in detail, those skilled in the art should understand that they can make various changes, substitutions and alterations herein without departing from the spirit and scope of the invention in its broadest form.

What is claimed is:

1. An optoelectronic device, comprising:
   a substrate; and
   a waveguide located within the substrate wherein the waveguide has a first portion having a width, a depth, and a refractive index, and a second portion having a different width, depth, and refractive index, wherein the waveguide includes a dopant comprising nickel or titanium.

2. The optoelectronic device as recited in claim 1 wherein the width is about 10 $\mu$m and the depth ranges from about 3 $\mu$m to about 6 $\mu$m and the different width ranges from about 3 $\mu$m to about 6 $\mu$m and the different depth ranges from about 1 $\mu$m to about 4 $\mu$m.

3. The optoelectronic device as recited in claim 1 wherein the first portion is a first coupling portion, the second portion is a modulation portion and the waveguide further includes a second coupling portion, wherein the modulation portion is located between the first coupling portion and the second coupling portion.

4. The optoelectronic device as recited in claim 1 wherein the substrate is a lithium niobate substrate and further includes an electrode located adjacent the first portion.

5. The optoelectronic device as recited in claim 1 wherein the first portion has a surface dopant density and the second portion has a different surface dopant density.

6. The optoelectronic device as recited in claim 5 wherein a ratio of the surface dopant density in the second portion to the surface dopant density in the first portion ranges from about 6:5 to about 2:1.

7. The optoelectronic device as recited in claim 1 wherein the differing widths and depths help optimize a mode size at input and output ports and further help optimize the mode size to minimize driving voltage under electrodes.

8. A method of manufacturing an optoelectronic device, comprising:
   providing a substrate; and
   creating a waveguide within the substrate, wherein the waveguide includes a dopant comprising nickel or titanium, including;
      forming a first portion with a width, a depth, and a refractive index; and
      forming a second portion having a different width, different depth, and different refractive index.

9. The method as recited in claim 8 wherein forming a first portion with a width and depth includes forming the first portion with a width of about 10 $\mu$m and a depth ranging from about 3 $\mu$m to about 6 $\mu$m, and forming a second portion having a different width and different depth includes forming the second portion with a different width ranging from about 3 $\mu$m to about 6 $\mu$m and a different depth ranging from about 1 $\mu$m to about 4 $\mu$m.

10. The method as recited in claim 8 wherein forming a first portion includes forming a first coupling portion, forming a second portion includes forming a modulation portion and wherein forming a first coupling portion further includes forming a second coupling portion, wherein the modulation portion is located between the first coupling portion and the second coupling portion.

11. The method as recited in claim 8 wherein providing a substrate includes providing a lithium niobate substrate and further includes forming an electrode adjacent the first portion.

12. The method as recited in claim 8 wherein forming a first portion includes forming a first portion with a surface dopant density, and forming a second portion includes forming a second portion with a different surface dopant density.

13. The method as recited in claim 12 wherein forming a first portion with a surface dopant density and forming a second portion with a different surface dopant density includes forming a ratio of the surface dopant density in the second portion to the surface dopant density in the first portion that ranges from about 6:5 to about 2:1.

14. The method as recited in claim 8 wherein forming a first portion includes forming the first portion using a first diffusion material layer in a first diffusion step and forming a second portion includes forming the second portion using a second diffusion material layer in a second diffusion step.

15. The method as recited in claim 14 wherein a dopant density of the first diffusion material layer ranges from about 20 micrograms/cm$^2$ to about 25 micrograms/cm$^2$ and a dopant density of the second diffusion material layer ranges from about 30 micrograms/cm$^2$ to about 50 micrograms/cm$^2$.

16. An optical communications system, comprising:
   a modulator, including;
      a substrate; and
      a waveguide located within the substrate wherein the waveguide has a first portion with a width, a depth, and a refractive index, and a second portion with a different width, different depth, and different refractive index; wherein the waveguide includes a dopant comprising nickel or titanium, and
   an optical fiber coupled to the modulator.

17. The optical communications system as recited in claim 16 wherein a transition between the first portion and the second portion is a smooth transition.

18. The optical communications system as recited in claim 16 further including devices coupled to the modulator that are selected from the group consisting of:

lasers, photodetectors, optical amplifiers, transmitters, and receivers.

* * * * *